(12) United States Patent
Arends et al.

(10) Patent No.: US 10,792,878 B2
(45) Date of Patent: Oct. 6, 2020

(54) PRESSING DEVICE FOR TIRE-BUILDING MACHINES

(71) Applicant: HARBURG-FREUDENBERGER MASCHINENBAU GMBH, Hamburg (DE)

(72) Inventors: André Arends, Hamburg (DE); Jan-Sören Meyermann, Bad Bevensen (DE); Albert Milczarek, Hamburg (DE)

(73) Assignee: HARBURG-FREUDENBERGER MASCHINENBAU GMBH, Hamburg (DE)

(*) Notice: Subject to any disclaimer, the term of this patent is extended or adjusted under 35 U.S.C. 154(b) by 217 days.

(21) Appl. No.: 15/575,003

(22) PCT Filed: Mar. 23, 2016

(86) PCT No.: PCT/DE2016/000135
§ 371 (c)(1),
(2) Date: Nov. 17, 2017

(87) PCT Pub. No.: WO2016/184446
PCT Pub. Date: Nov. 24, 2016

(65) Prior Publication Data
US 2018/0141295 A1    May 24, 2018

(30) Foreign Application Priority Data

May 19, 2015  (DE) .......................... 10 2015 006 372

(51) Int. Cl.
*B29D 30/28* (2006.01)

(52) U.S. Cl.
CPC ................................... *B29D 30/28* (2013.01)

(58) Field of Classification Search
CPC .................... B29D 30/28; B29D 2030/3257
(Continued)

(56) References Cited

U.S. PATENT DOCUMENTS 1,970,780 A * 8/1934 Stevens ................. B29D 30/28
156/398
3,251,722 A * 5/1966 Holman ................. B29D 30/60
156/130

(Continued)

FOREIGN PATENT DOCUMENTS

CN    206338280 U  *  7/2017
EP    1867467 A1    12/2007
(Continued)

OTHER PUBLICATIONS

ESpaceNet English Translation of CN-206338280-U (Year: 2019).*

*Primary Examiner* — Robert C Dye
*Assistant Examiner* — Alexander D Booth
(74) *Attorney, Agent, or Firm* — Lucas & Mercanti, LLP; Klaus P. Stoffel

(57) ABSTRACT

A pressing device for tire-building machines, having a pressing device axis, a plurality of disk elements, and at least one force application device for applying force to at least one of the disk elements. The pressing device is divided into at least two zones and the zones are equipped with force application devices of different types such that a surface pressure made uniform or a surface pressure gradient can be applied to a tire semifinished-product web in some regions by the plurality of disk elements.

7 Claims, 7 Drawing Sheets

(58) Field of Classification Search
USPC .................. 156/408, 409, 411, 412, 413
See application file for complete search history.

(56) References Cited

U.S. PATENT DOCUMENTS

| | | | |
|---|---|---|---|
| 5,257,965 A | | 11/1993 | Fuchs et al. |
| 5,454,897 A | * | 10/1995 | Vaniglia ............... B29C 70/32 156/166 |
| 5,975,179 A | * | 11/1999 | Kelly, Jr. ............. F16C 13/003 156/412 |
| 6,105,648 A | | 8/2000 | Degraaf et al. |
| 6,390,169 B1 | * | 5/2002 | Johnson ............... B29C 70/384 156/523 |
| 7,857,251 B2 | * | 12/2010 | Aveldson .............. B44C 1/105 156/358 |
| 8,042,594 B2 | * | 10/2011 | Miller ................. B29C 70/382 156/358 |
| 2007/0044922 A1 | | 3/2007 | Mischler |
| 2007/0289694 A1 | | 12/2007 | Macheffe et al. |
| 2009/0213035 A1 | | 9/2009 | Malterer et al. |

FOREIGN PATENT DOCUMENTS

| | | |
|---|---|---|
| EP | 2087984 A1 | 8/2009 |
| WO | 9013706 A1 | 11/1990 |
| WO | 9818613 A1 | 5/1998 |
| WO | 2009131451 A1 | 10/2009 |

\* cited by examiner

PRESSING DEVICE FOR TIRE-BUILDING MACHINES

The present application is a 371 of International application PCT/DE2016/000135, filed Mar. 23, 2016, which claims priority of DE 10 2015 006 372.3, filed May 19, 2015, the priority of these applications is hereby claimed and these applications are incorporated herein by reference.

BACKGROUND OF THE INVENTION

The invention relates to a pressing device for tire-building machines, having a pressure-roller axle and a plurality of disk elements and at least one force-impinging device for implementing an effect of force on at least one of the disk elements.

Manufacturing a tire, for example for vehicles such as automobiles or motorcycles, is an extremely complex process which is composed of a multiplicity of manufacturing and processing steps. The reason therefor is the complicated construction of a tire, which is composed of a significant number of different individual components. Moreover, this multiplicity of components have to be interconnected under the effect of pressure and temperature, i.e. by so-called vulcanization.

Not only the finished tire as the final product of the tire manufacturing process, but already the tire blank is a highly complex component that is composed of many semi-finished product elements. As a result of the multi-layered construction, the individual components have first and prior to a vulcanization process to be joined together, that is to say that the tire components are singularized to the correct size and fed to a carcass drum in a correct manner in terms of location, position, and orientation, said carcass drum being located within a tire-building machine. The tire blank is manufactured and prepared for vulcanizing in this way.

Many of the tire components are configured as web-shaped and/or arcuate semi-finished products: various rubber compounds and natural-rubber-based composite materials, woven textile fabrics or textile cord, respectively, woven steel-belt fabrics, and natural-rubber sheathed bead cores. To some extent, layer servers are used within a tire-building machine in order for these web-shaped and/or arcuate semi-finished products to be fed to the carcass drum.

In the context of tire manufacturing, pressure rollers in particular within tire-building machines serve for implementing a compressive force on the individual components which prior to the manufacturing step of vulcanization are present as web-shaped or arcuate materials or semi-finished products, respectively, and within the tire-building machine are combined to form one semi-finished tire product. Apart from the tire components per se, core fillers, wedge strips, lateral strips, and further elements may also need to be attached by pressing.

Pressure rollers in principle serve for pressing, for example, web-shaped and arcuate materials of identical and/or dissimilar thickness, profiles, and elasticities, said pressing being initiated by a compressive force acting on said materials. To this end, following the geometric properties of a pressure roller as a rotationally symmetrical component, a surface pressure is applied along a linear contact face, the latter being narrow in comparison to the diameter of the pressure roller.

A particular problem exists when the components to be pressed have unequal thickness dimensions and/or a profiled surface, as is often the case in the production of tires. As a result of the linear contact face across the web width in conjunction with locally unequal thickness dimensions and/or profiled surfaces, extremely high surface pressures which can exceed optional permissible limit values and can damage or destroy the semi-finished product arise in some parts.

In order to provide pressure rollers which either enable a uniform compressive force also in the case of different thickness dimensions and/or profiled surfaces, or in order for dissimilar surface pressures to be generated in a locally targeted manner, in particular in the context of tire-building machines, or for the tire manufacturing process, respectively, pressure rollers were constructed of which the cylinder face are formed by a plurality of elements, so called disk elements or annular elements, which are movable in relation to one another and in the radial direction and which enable the surface contour of the pressure roller to be adapted to the geometric properties of the material to be pressed in terms of thickness and/or contour. In this way, either the surface pressure can be introduced in a homogenized manner along the contact line, or a surface pressure gradient can be introduced in a targeted manner. The disk elements are preferably mounted and in terms of function coupled in such a manner that, additionally to the radial mobility, at least one rotational degree of freedom in relation to the pressure-roller axle is present.

Depending on the pressure characteristic required, it is necessary for at least one disk element or for a group of disk elements to impinge by way of a defined force in the direction of the material to be compressed. The force acting in each case on one disk element causes the radial mobility component of the disk element, on the one hand, and the resulting surface pressure that acts by way of the disk element and the respective contact face on the material to be compressed, on the other hand.

Pressure rollers having a multiplicity of disk elements and the potential for the defined force to be applied by way of suitable and in each case separate force-impinging devices for each individual disk element have the advantage that locally different surface pressures can be introduced into the compressed material and/or that very precisely adjustable surface-pressure gradients can be implemented across the contact line. However, pressure rollers in this constructive design embodiment, on account of the complicated construction and of the multiplicity of force-impinging devices required, result in high costs and are both prone to malfunctions and also maintenance-intensive.

Further, in the case of pressure rollers having in each case separate force-impinging devices for each individual disk element, the stability and the resistance to deformations are problem areas. In order for a compact construction mode to be facilitated, the force-impinging devices have to be disposed within the pressure roller such that said devices quasi form the axle of the pressure roller, the disk elements having a rotational degree of freedom in relation to the axle being disposed about said axle.

There is therefore the necessity in terms of construction for the in each case separate force-impinging devices to be connected or integrated so as to form an axle, this having the consequence that high requirements are to be set in terms of the strength of the connection technique. Furthermore, the connection means must be releasable in order for the replacement of individual force-impinging devices to be enabled. However, axle constructions that are composed of releasably interconnected individual elements do not offer the rigidity in terms of deformation that is often required, in particular in the context of tire-building machines and the compressive forces required.

Pressure rollers having a multiplicity of disk elements and the potential for implementing by a suitable force-impinging device that is common to all disk elements and is based on pneumatic principles of action can facilitate the homogenization of the surface pressure and thus the reduction in surface-pressure gradients also in the case of different thickness dimensions and/or profiled surfaces. Pressure rollers in this constructive design embodiment are constructed in a less complicated manner and, on account thereof, are cost-effective and robust, but do not enable the surface pressure to be increased in a local targeted manner.

SUMMARY OF THE INVENTION

It is therefore an object of the invention to provide a pressure roller which is favorable in terms of construction and which overcomes or at least reduces the disadvantages mentioned.

The teaching according to the invention realizes that these objectives can be achieved by a clever combination of force-impinging devices for individual and grouped disk elements. Furthermore, the invention proposes local and releasable connection techniques for improving the rigidity in terms of deformation of the pressure roller.

Depending on the requirements in terms of controlling and realizing a surface-pressure gradient along the contact line between the pressure roller and the semi-finished tire product material, the invention reduces the constructive effort and simultaneously increases the rigidity in terms of deformation by combining individual disk elements and disk elements that are capable of being impinged by force and combined in groups. Finally, the regions of the semi-finished tire web which require locally high or variable surface pressures are compressed by way of a pressure roller that is constructed according to the invention, said pressure roller having different zones equipped with disk elements which in each case are capable of being impinged by force individually or in groups. Such regions in the case of usual tire constructions are present in particular on the transition points between the tire walls and the tire tread regions. Special surface-pressure values can also be necessitated by special tread geometries or by tread geometries that have distinctive features on the tire tread surface.

Flexurally rigid and more cost-effective pressure rollers can be provided by subdividing the pressure roller into different zones, the location and the design embodiment of said zones being aligned with the unequal thickness dimensions and/or profiled surface regions of semi-finished tire webs and the linear contact face across the web width.

The invention provides that at least two zones are implemented within one pressure roller. A first zone herein is formed by one or a plurality of disk elements, said first zone by way of at least one force-impinging device opening up the potential for in each case one individual disk element to be impinged by a definable force. The second zone is formed by a plurality of disk elements, said second zone by way of at least one force-impinging device opening up the potential for the plurality of disk elements to be impinged collectively as a group by a definable force.

If a group, that is to say a plurality, of disk elements is to be collectively impinged by a definable force, it is conceivable for the force-impinging device to be implemented by way of an elastic pressure hose which is pressurized by means of a compressible medium and which impinges the group of disk elements with force in a homogenous manner, wherein a homogenous surface pressure along the linear contact face between the pressure-roller zone and the semi-finished tire web is facilitated by the resulting radial displaceability of each individual disk element in this zonal region.

If one disk element or a group of disk elements is/are to be in each case individually impinged by way of a definable force, it is conceivable for the force-impinging device to be realized by pressure-cylinder units which are pressurized by means of a compressible medium and which are actuatable in an individual or a collective manner.

Often, and in particular in tire manufacturing, comparatively complicated surface-pressure profiles or surface-pressure gradients, respectively, have to be realized across the contact face of the pressure roller and along the web-shaped material to be compressed. This situation is taken into account by the invention by way of pressure rollers having more than two zones.

Semi-finished tire webs, following the later shape of the finished tire, across the web width thereof are typically triple-stranded, wherein the two external strands on the web represent the side walls of the tire, and the central strand represents the tire tread surface. For this reason, the teaching according to the invention in one variant of embodiment has pressure rollers which have at least three zones for use in tire-building machines. The three pressure-roller zones can in each case have identical or mutually dissimilar force-impinging devices, wherein at least both identical as well as unequal forces are adjustable in terms of value.

Depending on the geometric specification of the semi-finished tire web, in particular in the transition regions between the strands, the invention identifies further advantages by using further zones in the construction of the pressure roller. The external strands, i.e. the strands that form the side walls of the finished tire, often have significantly thinner wall thicknesses than the central strand that forms the tire tread surface. The mutual transition regions of the strands are therefore characterized by significant jumps in thickness which in many instances require a particular specification of the surface-pressure gradient in order for optimal connection results to be obtained for the web layers.

For these reasons, the invention in these cases provides pressure-roller constructions having five zones, that is to say that, additionally to the zones for the side walls and for the tread surface of the later tire, zones which facilitate these particular specifications of the surface-pressure gradient are provided at the height of the strand transition regions. The respective zones in the strand transition regions can yet again be subdivided into zones, even multiple times, in order for even more precise surface pressures on the semi-finished tire web to be able to be initiated in a punctiform manner. It is envisaged that pressure rollers which have up to eleven zones are provided.

In principle, the force-impinging devices can be provided either outside or within the pressure roller. In the case of an external arrangement of the force-impinging devices, the disk elements by contact means are preferably impinged with a force opposite the contact face between the pressure roller and the web material, without the rotational degree of freedom of said disk elements being restricted. In the case of an internal arrangement of the force-impinging devices, the disk elements by contact means are preferably impinged with a force on the inside and facing the contact face between the pressure roller and the web material, said contact means likewise not impeding the rotational degree of freedom of the disk elements.

In order for the assembly effort, the space requirement, and the complexity to be reduced, the invention provides that the force-impinging devices are disposed within the pressure roller. The axle of the pressure roller herein as the rotation center point for the disk elements is preferably at least in part formed by the force-impinging devices or the elements of the latter.

On account of the arrangement of the force-impinging devices within the pressure roller, contact points which have to be connected in a suitable and preferably releasable manner in order for the function as a pressure-roller axle to be able to be fulfilled result at least in the regions of the adjacent zones and/or of mutually adjacent individual force-impinging devices. The pressure-roller axle has to be constructed in such a manner that a flexural rigidity that is as high as possible is facilitated.

In order for this objective to be reached the invention provides the cross-sectional design of the pressure-roller axle in a square or quadrangular manner in order for the very high directionally dependent deformation strength, in particular flexural strength, resulting from the resulting design strength to be utilized in an advantageous manner. The rectangular cross section is preferably provided in the case of particularly high loads, said rectangular cross section relative to the direction of the main load being aligned in such a manner that the longer lateral edges are parallel with the resulting line of acting force.

Furthermore, the invention on the lateral edges of the rectangular or quadrangular pressure-roller axles that are parallel with the resulting line of acting force in the regions of the contact points of the adjacent zones and/or of mutually adjacent individual force-impinging devices provides annular grooves into which reinforcement rings are insertable. Surprisingly, the flexural rigidity is improved even when this is a clearance fit of the mating partners. The improvements, that is to say the reduction in the deformation under load, on account of the reinforcement rings that are inserted into the annular grooves with a clearance fit, can be better by up to factor 6 than connection techniques without reinforcement rings.

The causal connection between these significant improvements is provided by the potential of a radial mobility of the connection partner at the contact point. As opposed to conventional connection technologies, the annular-groove/reinforcement-ring connection in the embodiment of a clearance fit facilitates a mutual radial displacement of the mating partners by the displacement path of the clearance. When the connection partners, following the displacement, by way of the end-side shoulders thereof bear on one another, and when the force-fit and the form-fit of the reinforcement ring within the annular groove has been established, significantly reduced stress peaks and an alignment of the resulting major stress component that deviates from the perpendicular result on account of the then prevailing favorable spacing conditions of the neutral phase in relation to the highly stressed traction/compression regions in the peripheral regions of the pressure-roller axle.

BRIEF DESCRIPTION OF THE DRAWING

Exemplary embodiments of the invention are schematically illustrated in the drawings hereunder, in which.

DETAILED DESCRIPTION OF THE INVENTION

Figure 1:
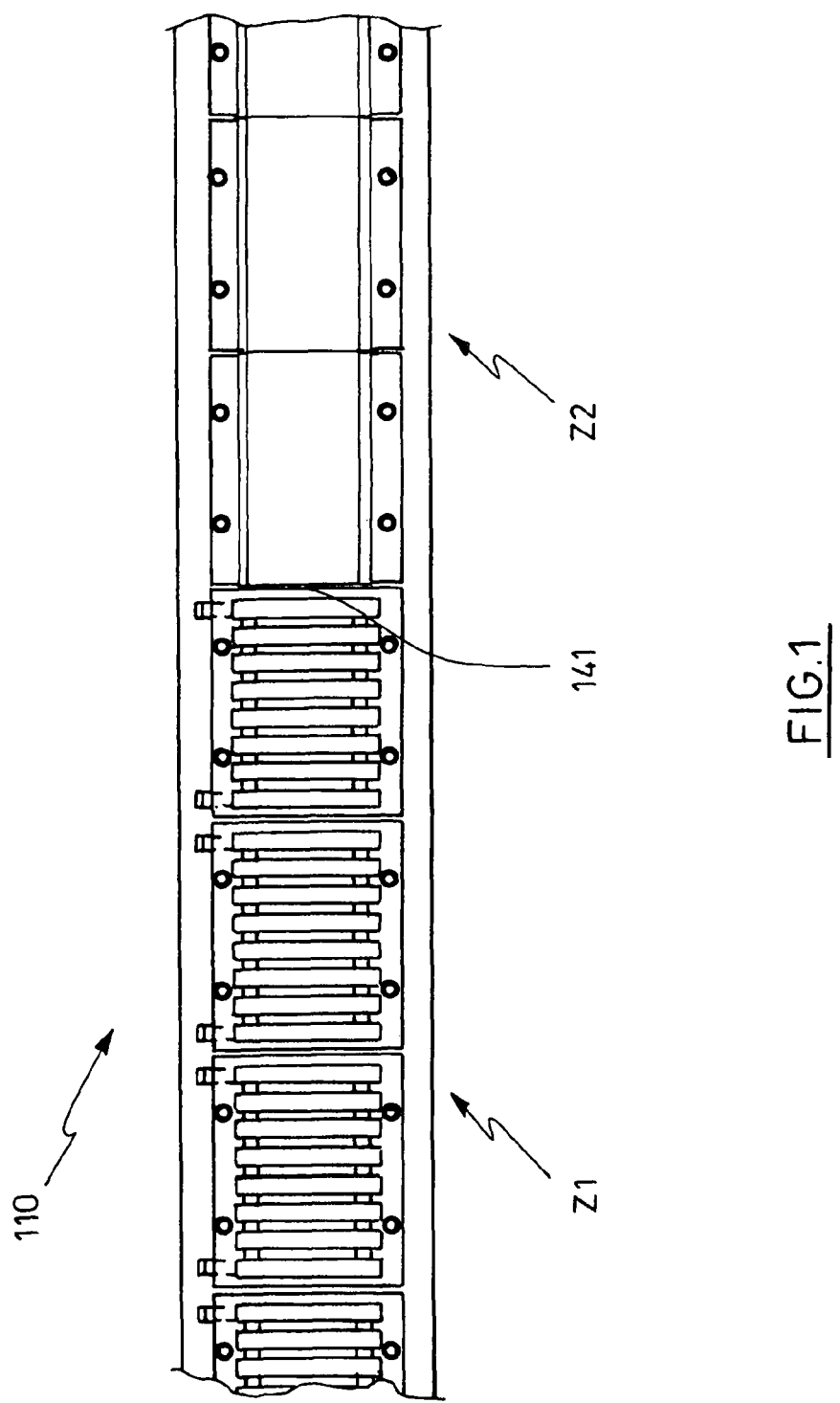
FIG. 1 shows the region adjacent to two zones of a pressure-roller axle in a sectional illustration.

FIG. 1 shows the region adjacent to two zones (Z1, Z2) of a pressure-roller axle (110) having the resulting zone contact point (141) in a sectional illustration. The force-impinging devices of the zones are illustrated in an exemplary manner.

Figure 2:
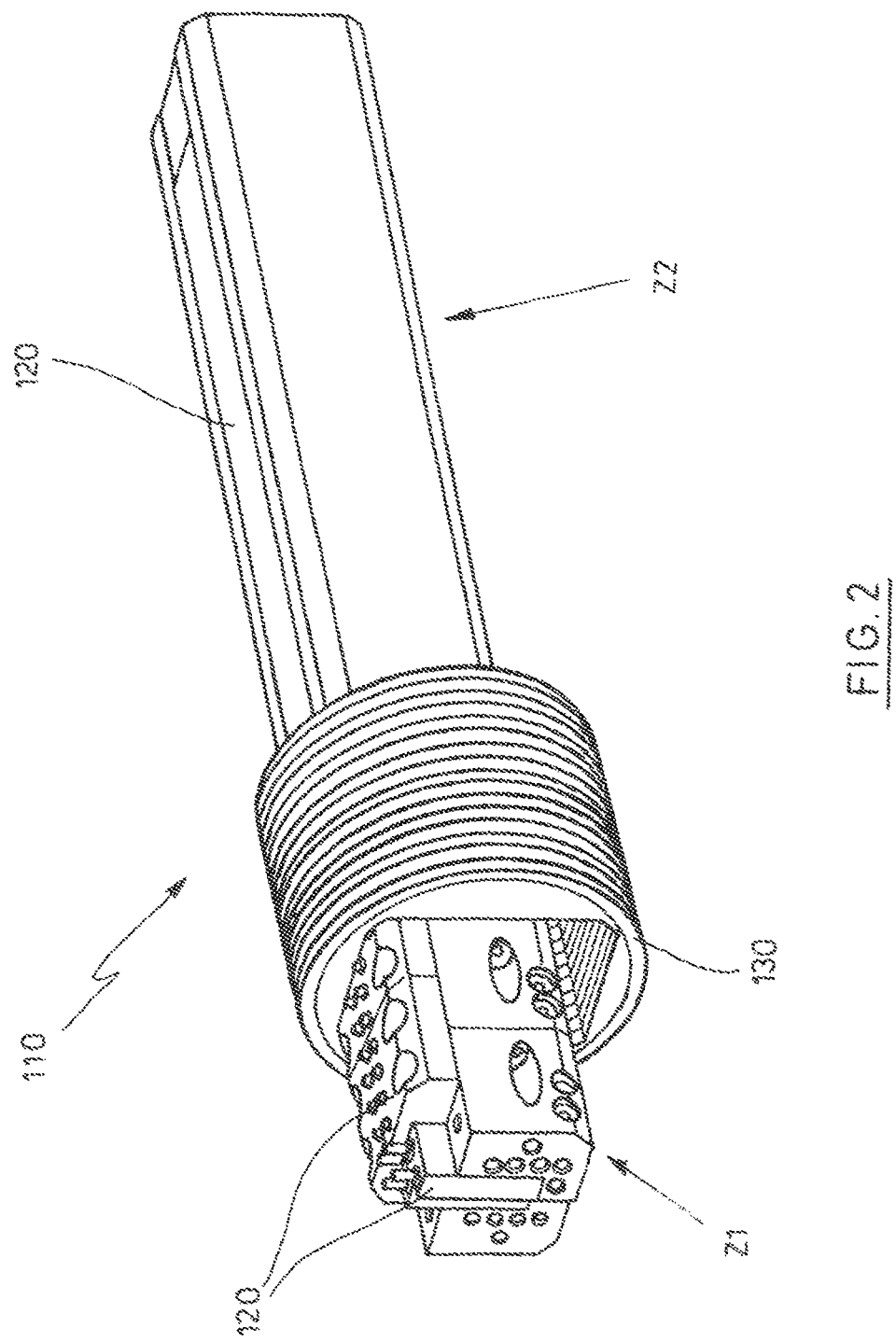
FIG. 2 shows two zones of a pressure-roller axle in a perspective illustration, having different force-impinging devices, and the illustration of a few disk elements that are depicted in an exemplary manner.

FIG. 2 shows two zones (Z1, Z2) of a pressure-roller axle (110) in a perspective illustration, having different force-impinging devices (120), and the illustration of a few disk elements (130) that are depicted in an exemplary manner. The cross section of the pressure-roller axle (110) in this exemplary embodiment is embodied so as to be rectangular having chamfered edges.

Figure 3:
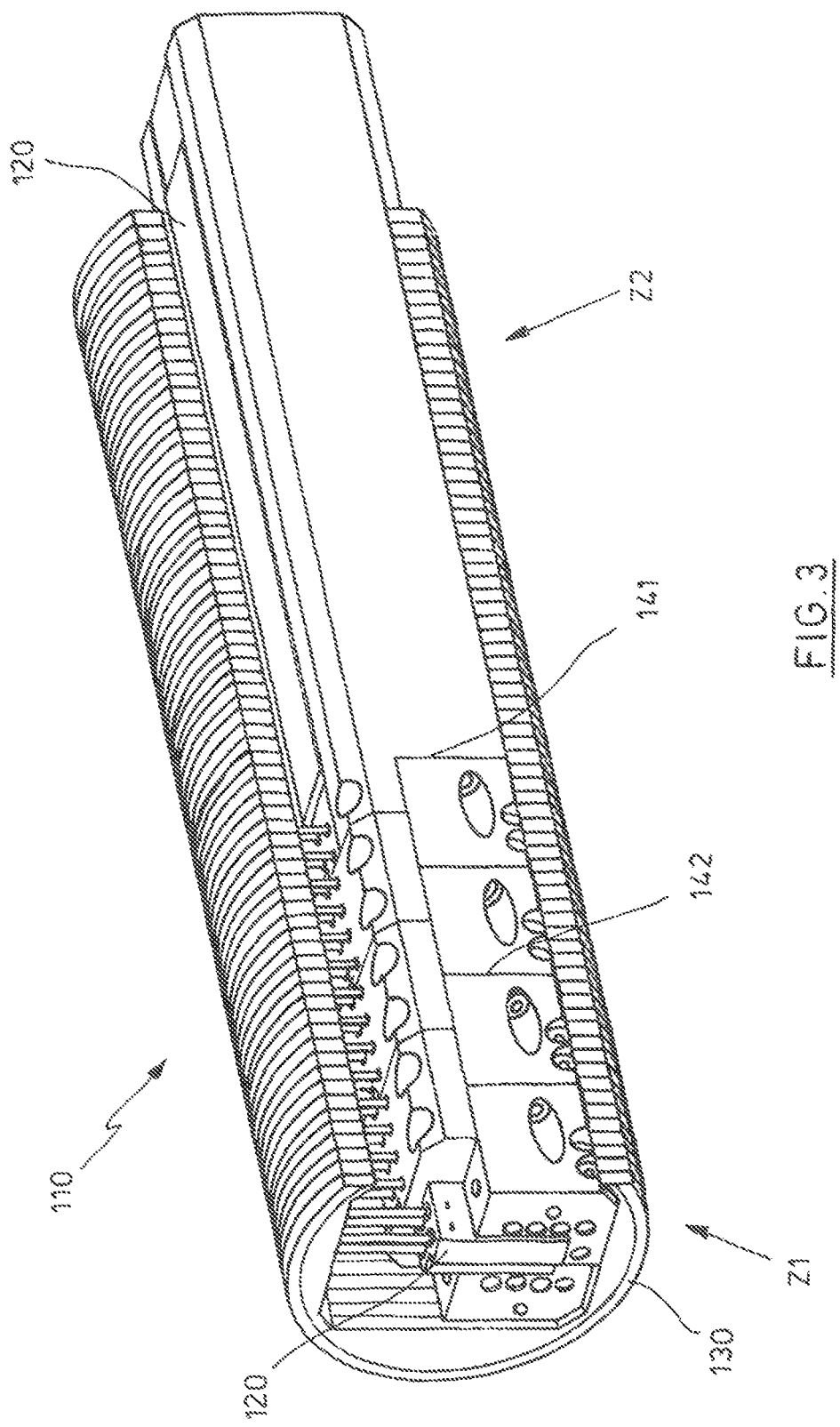
FIG. 3 shows two zones of a pressure-roller axle in a perspective illustration, having different force-impinging devices, and the sectional illustration of a multiplicity of disk elements.

FIG. 3 shows two zones (Z1, Z2) of a pressure-roller axle (110) in a perspective illustration, having different force-impinging devices (120) and a multiplicity of disk elements (130) in a terminal position following the impingement with force by way of at least one part of the force-impinging devices (120) provided.

Figure 4:
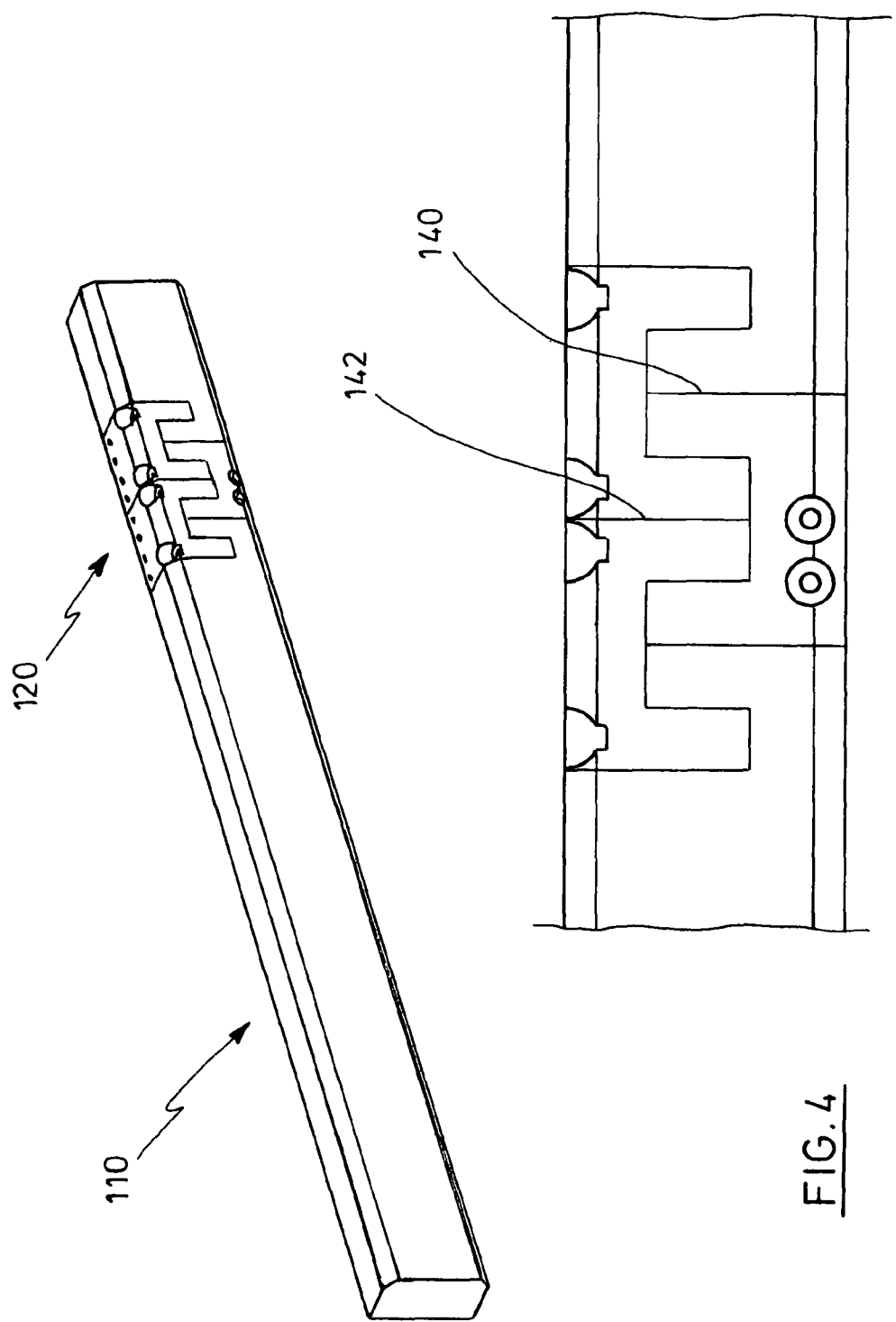
FIG. 4 shows exemplary contact points between force-impinging devices within one zone, in a perspective illustration and an enlarged fragment.

FIG. 4 in an exemplary manner depicts contact points (140) and force-impinging device contact points (142) between force-impinging devices (120) within one zone of a pressure-roller axle (110) in a perspective illustration and an enlarged fragment.

Figure 5:
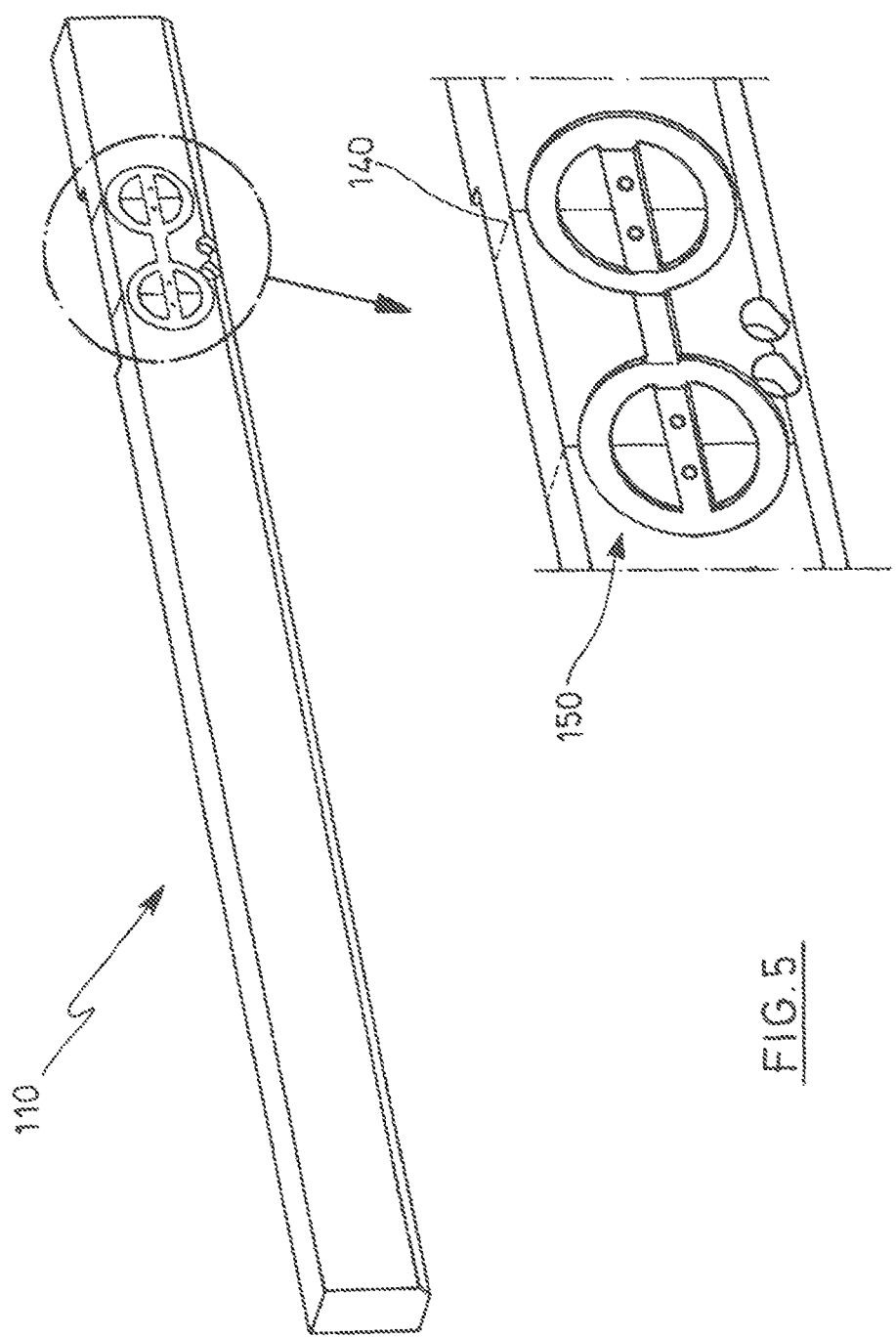
FIG. 5 shows the annular-groove/reinforcement-ring connections on contact points of a pressure-roller axle in a perspective illustration.

FIG. 5 shows the annular-groove/reinforcement-ring connections (150) on contact points (140) of a pressure-roller axle (110) in a perspective illustration. Annular grooves into which the reinforcement rings are insertable are incorporated into the lateral edges of the pressure-roller axle (110) that are parallel with the resulting line of acting force in the regions of the contact points (140).

Figure 6:
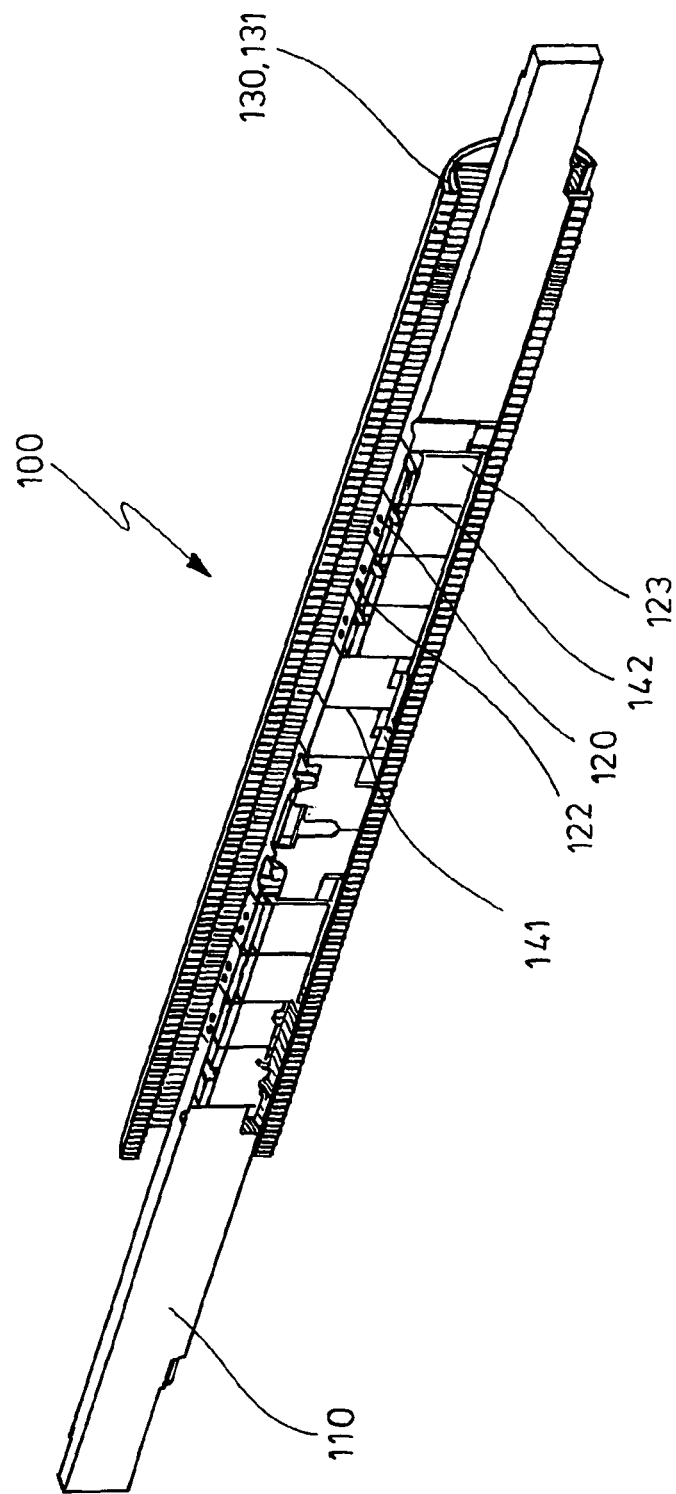
FIG. 6 shows an exemplary embodiment of the pressure roller having different zones, in a perspective sectional illustration.

FIG. 6 includes an exemplary embodiment of the pressure roller (100) having different zones in a perspective sectional illustration. It is conceivable in particular for the zones to be equipped in a modular manner with force-impinging devices (120). If cylinders (122) are provided, it is possible for the cylinder density per zone to be reduced so as to correspond to the present requirements in terms of the characteristic, the configuration, and the gradient of the surface pressure along the contact line between the pressure roller (100) and the semi-finished tire material, and for the unoccupied spaces to be filled by placeholder modules (123).

Figure 7:
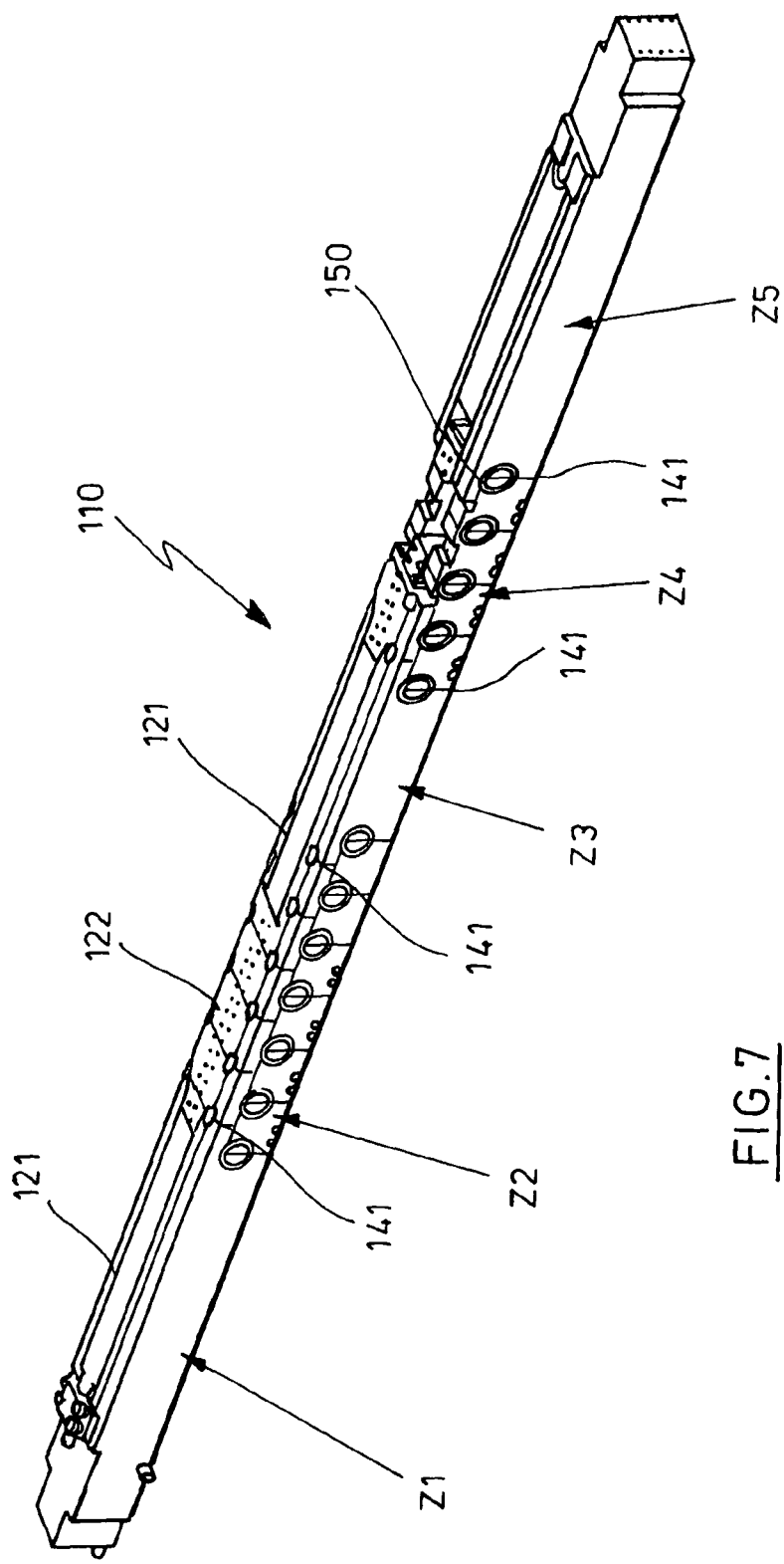
FIG. 7 shows a further exemplary embodiment of the pressure-roller axle having different zones and annular-groove/reinforcement-ring connections, in a three-dimensional illustration.

FIG. 7 shows a further exemplary embodiment of the pressure-roller axle (110) having different zones and annular-groove/reinforcement-ring connections in a three-dimensional illustration. Five zones (Z1, Z2, Z3, Z4, Z5) are implemented which depending on the location and requirements have different force-impinging devices (120) in the form of pressure hoses (121) or of at least one cylinder (122).

The zones Z1 to Z5 in terms of the location and configuration thereof are adapted to the preferably three strands of the semi-finished tire web and the transition regions of the latter, and are equipped with suitable force-impinging devices (120, 121, 122). The zones Z1 and Z5 are disposed so as to be opposite the external strands, that is to say the later side walls of the finished tire. As a consequence of the desired homogenous surface pressure, hoses (121), preferably in an elastic embodiment, are employed as force-impinging devices. The action of force on the disk elements (130) is performed by pressurizing the hoses (121), said disk elements (130) in turn initiating the surface pressure on the contact line toward the semi-finished tire web.

The zone Z3 is disposed so as to be opposite the central strand, that is to say the later tire tread surface. Here too, homogeneous surface pressures are required such that hoses (121), preferably in an elastic embodiment, are again employed as force-impinging devices.

The zones Z2 and Z4 are provided at the height of the strand transition regions. The mutual transition regions of the strands are characterized by significant jumps in thickness, the latter requiring a particular specification of the surface-pressure gradient in order for optimal connection results of the web layers to be achieved. In order for these requirements to be met, a plurality of cylinders (122) which are employable in a modular manner and which are actuatable individually or in groups are provided in the zones Z2 and Z4. In the example shown, the zones Z2 and Z4 are yet again subdivided, in each case into four, such that Z2 and Z4 in each case have four zones. The pressure-roller axle (110) therefore has a total of eleven zones.

The annular-groove/reinforcement-ring connections (150) according to the invention are provided in each case in the region of the zones Z2 and Z4, because the correspondingly high flexural load in these regions requires a connection that is particularly resilient to deformation.

The invention claimed is:

1. A pressing device for a tire-building machine, comprising: a pressing-device axle; a plurality of disk elements rotatable around the axle; and force-impinging devices for implementing a force on at least one of the disk elements, wherein the pressing device is subdivided into at least two zones, the zones being respectively equipped with force-impinging devices of dissimilar type for inputting a homogenized surface pressure or a surface-pressure gradient in regions of a semi-finished tire web by the plurality of disk elements, wherein the pressing device has at least three zones configured and disposed so that one of three strands of a semi-finished tire web is applied with the surface pressure in a respective one of the zones, wherein the pressing device has at least two additional zones configured and disposed between the three zones so that a surface-pressure gradient by way of in each case one of the additional zones is embossable into the transition regions of the three strands of the semi-finished tire web, wherein the at least two additional zones of the pressing device are in each case subdivided into at least two further zones so that a surface-pressure gradient is embossable into the transition regions of the three strands of a semi-finished tire web, wherein the force-impinging devices include a first force-impinging device that is an expansible hose arranged in a middle region along the axle of the pressing device and at least one second force-impinging device that is a cylinder arranged aside along the axle from the middle region.

2. The pressing device for a tire-building machine according to claim 1, wherein the pressing-device axle is formed to receive the cylinders in a modular manner.

3. The pressing device for a tire-building machine according to claim 2, further comprising placeholder modules receivable in the pressing-device axle.

4. The pressing device for a tire-building machine according to claim 1, wherein the force-impinging devices at least in part are an integral component part of the pressing-device axle.

5. The pressing device for a tire-building machine according to claim 1, wherein the pressing-device axle is configured at least in part by the force-impinging devices.

6. The pressing device for a tire-building machine according to claim 1, wherein the pressing-device axle has contact points which at least in part are connected by annular-groove/reinforcement-ring connections.

7. A tire-building machine for manufacturing tires, comprising a pressing device according to claim 1.

* * * * *